United States Patent [19]

Lyons et al.

[11] Patent Number: 5,893,545

[45] Date of Patent: Apr. 13, 1999

[54] SEAT TRACK ASSEMBLY WITH ENHANCED VERTICAL DISLOCATION RESISTANCE

[75] Inventors: Dale E. Lyons, Cassopolis, Mich.; Ruben Hernandez, Roscoe, Ill.

[73] Assignee: Excel Industries, Inc., Elkhart, Ind.

[21] Appl. No.: 08/956,661

[22] Filed: Oct. 23, 1997

[51] Int. Cl.$^6$ ...................................................... F16M 13/00
[52] U.S. Cl. .................................................................. 248/420
[58] Field of Search ....................................... 248/429, 430, 248/420; 296/65.11, 65.12, 65.13, 65.14; 297/341, 344.1

[56] References Cited

U.S. PATENT DOCUMENTS

| | | | |
|---|---|---|---|
| 3,940,182 | 2/1976 | Tamura | 297/341 |
| 4,101,169 | 7/1978 | Muraishi et al. | 297/341 |
| 4,190,226 | 2/1980 | Letournoux et al. | 248/429 |
| 4,204,658 | 5/1980 | Gourtois | 248/430 |
| 4,238,099 | 12/1980 | Hunwicks | 248/430 |
| 4,378,101 | 3/1983 | Kazaoka et al. | 248/429 |
| 4,423,904 | 1/1984 | Crawford | 297/341 |
| 4,440,442 | 4/1984 | Drouillard et al. | 297/341 |
| 4,449,752 | 5/1984 | Yasumatsu et al. | 297/341 |
| 4,526,424 | 7/1985 | Korth | 248/430 X |
| 4,569,557 | 2/1986 | Goforth | 297/341 |
| 4,601,455 | 7/1986 | Lowe et al. | 248/349 |
| 4,621,867 | 11/1986 | Perring et al. | 297/341 |
| 4,639,038 | 1/1987 | Heling | 297/341 |
| 4,648,657 | 3/1987 | Cox et al. | 297/341 |
| 4,652,052 | 3/1987 | Hessler et al. | 297/341 |
| 4,671,571 | 6/1987 | Gionet | 297/341 |
| 4,707,030 | 11/1987 | Harding | 297/341 |
| 4,742,983 | 5/1988 | Nihei | 248/429 |
| 4,756,503 | 7/1988 | Fujita | 248/430 |
| 4,781,354 | 11/1988 | Nihei et al. | 248/429 |
| 4,804,229 | 2/1989 | Nishino | 297/341 |
| 4,844,542 | 7/1989 | Humer | 297/341 |
| 4,852,846 | 8/1989 | Weier | 248/430 |
| 4,880,084 | 11/1989 | Tanaka et al. | 108/627 |
| 4,881,774 | 11/1989 | Bradley et al. | 297/341 |
| 4,909,570 | 3/1990 | Matsuhashi | 297/341 |
| 4,951,966 | 8/1990 | Nihei | 296/65.1 X |
| 4,969,621 | 11/1990 | Münchow et al. | 248/429 |
| 4,979,716 | 12/1990 | Holdampf | 248/420 X |
| 5,020,853 | 6/1991 | Babbs | 297/341 |
| 5,052,751 | 10/1991 | Hayakawa et al. | 297/341 |
| 5,100,092 | 3/1992 | Sovis | 248/429 |
| 5,104,084 | 4/1992 | Kumagai et al. | 248/430 |
| 5,222,814 | 6/1993 | Boelryk | 248/430 X |
| 5,273,241 | 12/1993 | Droulon | 248/429 |
| 5,286,076 | 2/1994 | DeVoss et al. | 296/65.14 |
| 5,318,341 | 6/1994 | Griswold et al. | 297/362.11 |
| 5,322,348 | 6/1994 | Johnson et al. | 248/430 X |
| 5,352,019 | 10/1994 | Bauer et al. | 297/341 |
| 5,358,207 | 10/1994 | West | 248/430 |

(List continued on next page.)

*Primary Examiner*—Ramon O. Ramirez
*Attorney, Agent, or Firm*—Banner & Witcoff, Ltd.

[57] ABSTRACT

A seat track assembly comprises a lower track assembly comprising first and second lower tracks laterally spaced from and aligned generally parallel with one another. Each lower track has a bottom wall and left and right side walls which cooperate with the bottom wall to define a central channel running the length of the lower track. The left and right side walls each have flanges bent over and away from the central channel. An upper track assembly operatively engages the lower track assembly. The upper track assembly comprises first and second upper tracks carried by corresponding first and second lower tracks, allowing the upper track assembly to slide in forward and rearward directions. An elongate upper J-hook is rigidly attached to each upper track, preferably at a top wall of each upper track. An elongate lower J-hook is rigidly attached to each lower track, preferably at a bottom wall of each track. Each upper J-hook slides freely past a corresponding lower J-hook in a normal condition, and each upper J-hook is received by a corresponding lower J-hook to limit vertical dislocation of the upper track assembly from the lower track assembly. The seat track assembly can be used, for example, on a seat anchored to a motor vehicle with spring-biased attachment hooks.

17 Claims, 4 Drawing Sheets

U.S. PATENT DOCUMENTS

| | | | |
|---|---|---|---|
| 5,362,132 | 11/1994 | Griswold et al. | 297/483 |
| 5,383,640 | 1/1995 | Johnson et al. | 248/372.1 |
| 5,390,981 | 2/1995 | Griswold | 297/378.12 |
| 5,407,165 | 4/1995 | Balocke | 248/429 |
| 5,531,503 | 7/1996 | Hughes | 297/341 |
| 5,547,159 | 8/1996 | Treichi et al. | 248/429 |
| 5,567,013 | 10/1996 | Chang | 297/341 |
| 5,597,206 | 1/1997 | Ainsworth et al. | 297/378.12 |
| 5,605,377 | 2/1997 | Tame | 297/341 |
| 5,626,392 | 5/1997 | Bauer et al. | 297/341 |

SEAT TRACK ASSEMBLY WITH ENHANCED VERTICAL DISLOCATION RESISTANCE

FIELD OF THE INVENTION

The present invention relates generally to a seat track assembly having enhanced resistance to separation loading, and is particularly useful for all-belts-to-seats (ABTS) seat track assemblies and related seat track assemblies with high strength requirements.

BACKGROUND OF THE INVENTION

Seat track assemblies are commonly used for forward and rearward comfort adjustment of seat assemblies, particularly seat assemblies affixed in motor vehicles. Such seat assemblies normally have a seat base and a seat back, with the seat back pivotably connected to the seat base by a recliner. The seat base is commonly mounted over a pair of upper seat tracks which are slidable over a pair of lower seat tracks. Each upper track is releasably secured to its corresponding lower track by a latch mechanism operable by a release lever, "towel bar" or other well known device. Such seat track assemblies used in motor vehicles are typically attached to a floor pan and optionally to side pillars so that each lower track and other componentry rigidly attached to each lower track are fixed with respect to the motor vehicle, and the upper tracks and the componentry mounted to them (that is, the seat cushion, etc.,) are adjustable to a range of fore-and-aft positions.

The upper and lower tracks are vertically interlocked, often with a reduced friction interface between them for ease of fore-and-aft position adjustment, such that the seat cannot be easily vertically dislocated from the lower tracks. Greater vertical dislocation forces may be experienced, however, than the interlocking tracks can withstand without unacceptable levels of permanent deformation or other damage. This is especially true for seat assemblies in which a seat belt system is mounted directly to the seat assembly, known as "all-belts-to-seat" designs, rather than to the side pillars or to the floor pan. U.S. Pat. No. 5,362,132, issued to Griswold et al, and U.S. Pat. No. 5,322,348 issued to Johnson illustrate the known approach of employing exterior mounted J-hooks to anchor a seat cushion frame to the lower track subassembly against upward dislocation forces. In the normal operation, upper and lower J-hooks are free to slide past one another during comfort adjustment of the upper track with respect to the lower tracks. In the event of high vertical dislocation forces, however, the seat cushion frame would lift only until the upper J-hook contacts its fixed counterpart. Thus, the J-hook arrangement enables the vehicle seat to withstand vertical dislocation forces beyond the level which can be withstood by the more lightly designed interlocking seat tracks.

While such known J-hook arrangements are useful in withstanding excessive vertical dislocation forces, they tend to be relatively expensive and bulky. This is particularly undesirable in seat track assemblies used in motor vehicles where interior space is at a premium and there is continuous pressure to reduce costs.

In view of the foregoing, it is an object of the present invention to provide a seat track assembly with enhanced resistance to vertical dislocation forces which is of low cost and reduced size. Additional objects and features of the invention will become apparent from the following disclosure and detailed description of various preferred embodiments.

SUMMARY

In accordance with these and other objects, a seat track assembly for a seat comprises a fixed lower track assembly having first and second lower tracks, laterally spaced from and aligned generally parallel with one another. Each lower track forms a longitudinal central channel. More specifically, each lower track has left and right side walls cooperating to define the central channel. In the installed position, the central channels of the lower tracks are upwardly open and extend in a fore-and-aft direction. The left and right side wall each has a longitudinally extending flange, preferably bent outwardly away from the central channel. An upper track assembly is slidably adjustable over the lower track assembly and comprises first and second upper tracks carried by the corresponding lower tracks. A latch assembly mounted to the upper tracks releasably engages the lower tracks. The latch assembly is movable from a normal latching position to an unlatching position which allows for comfort adjustment, that is, fore-and-aft position adjustment of the upper track assembly with respect to the lower track assembly. A longitudinally extending J-hook assembly is provided in at least one and preferably each of the central channels. An elongate upper J-hook is rigidly attached to an upper track and extends downwardly into the central channel. An elongate lower J-hook is rigidly attached to a corresponding lower track and extends upwardly into the central channel. The upper J-hook preferably slides free of the lower J-hook during comfort adjustment. By this is meant that the upper J-hook slides longitudinally without interference from the corresponding lower J-hook, and preferably without contacting the lower J-hook in the normal operating condition. In alternative embodiments, the upper J-hook, while still sliding free of the lower J-hook as that term is used here, makes sliding contact with the lower J-hook during comfort adjustment in the normal operating condition. The upper J-hook is received by the corresponding lower J-hook so that when the seat track assembly is subjected to a vertical dislocation force the J-hooks engage one another, preventing unacceptable deformation of the upper and lower seat tracks. In accordance with certain preferred embodiments, the internally mounted J-hooks can be made of an aluminum extrusion.

From the foregoing disclosure and the following more detailed description of various preferred embodiments it will be apparent to those skilled in the art that the present invention provides a significant advance in the technology and art of seat track assemblies with enhanced vertical dislocation resistance. Particularly significant in this regard is the potential the invention affords for reducing the overall size of the seat track assembly, while providing enhanced strength, for meeting existing and future design parameters and for low cost. Additional features and advantages of various preferred embodiments will be better understood in view of the detailed description provided below.

Figure 4:
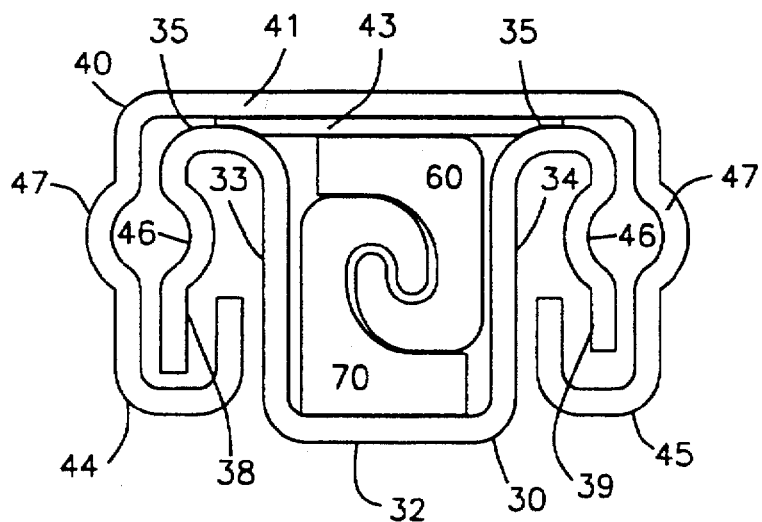
FIG. 4 is a cross section view taken along line 4—4 in FIG. 3, showing a normal operating condition where an upper J-hook is free to slide past a lower J-hook.

It should be understood that the appended drawings are not necessarily to scale, presenting a somewhat simplified representation of various preferred features illustrative of the basic principles of the invention. The specific design features of a seat track with enhanced vertical dislocation resistance as disclosed here, including, for example, the specific dimensions of the upper and lower J-hooks, will be determined in part by the particular intended application and use environment. Certain features of the illustrated embodiments have been enlarged or distorted relative to others to facilitate visualization and clear understanding. In particular, thin features may be thickened, for clarity of illustration. All references to direction and position, unless otherwise indicated, refer to the orientation of the seat track assembly illustrated in the drawings. In general, forward and rearward refers to directions, respectively, perpendicular to the plane of the paper in the side view of FIGS. 4 and 5, and up, down or vertical refers to corresponding up, down and vertical directions in the plane of the paper in FIGS. 4 and 5.

DETAILED DESCRIPTION OF CERTAIN PREFERRED EMBODIMENTS

It will be apparent to those skilled in the art, that is, to those who have knowledge or experience in this area of technology, that many design variations are possible for the seat track assembly disclosed here with internal J-hooks for enhanced vertical dislocation resistance. The following detailed discussion of various alternative and preferred features and embodiments will illustrate the general principles of the invention with reference to a seat track assembly used in a motor vehicle seat, particularly for an all-belts-to-seat application where the seat belt is mounted exclusively on the seat, although the principles of the invention will be applicable to seats used elsewhere.

Figure 1:
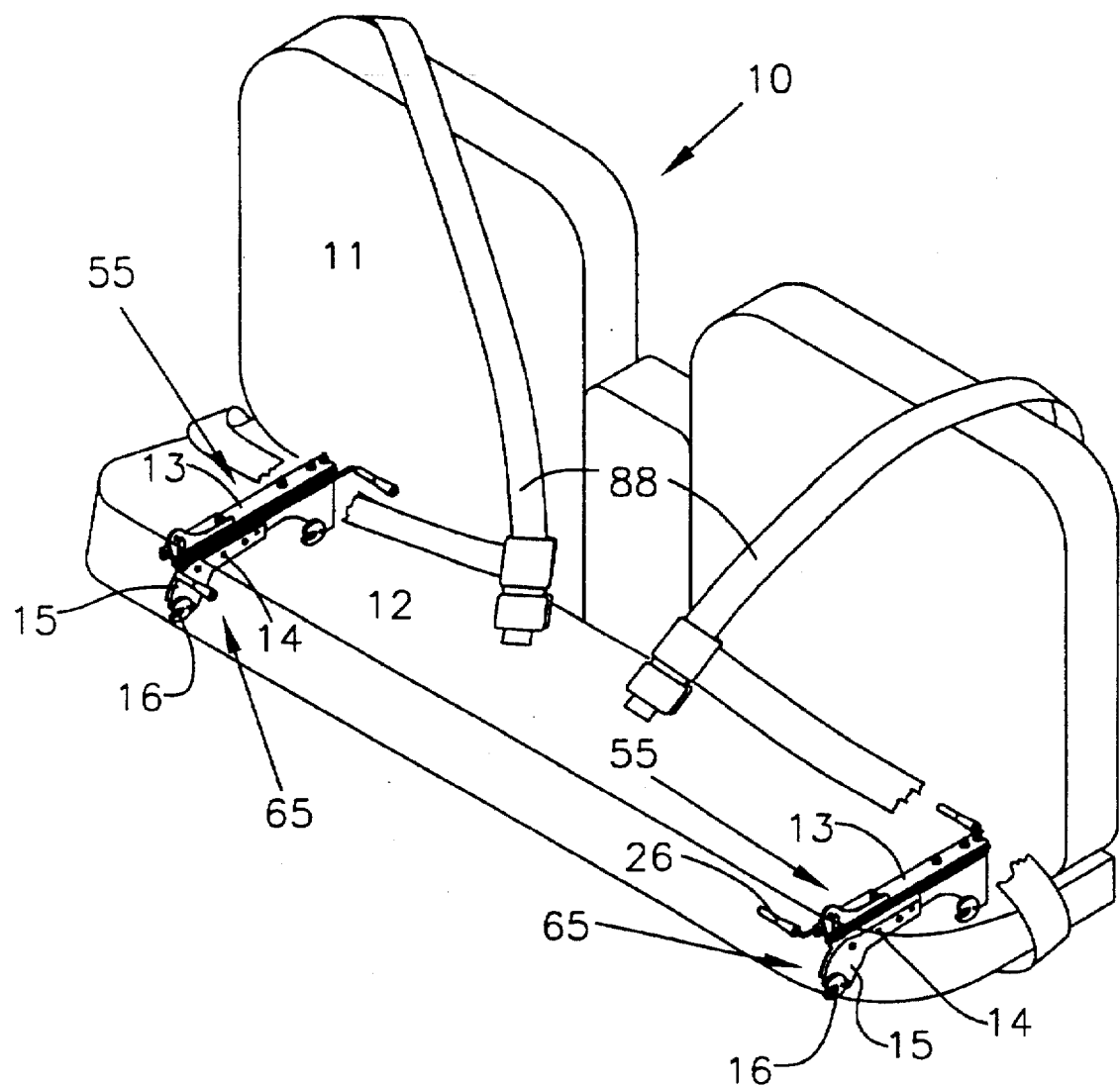
FIG. 1 is a perspective view of a seat comprising a seat track assembly with enhanced resistance to vertical dislocation in accordance with a preferred embodiment.
Figure 2:
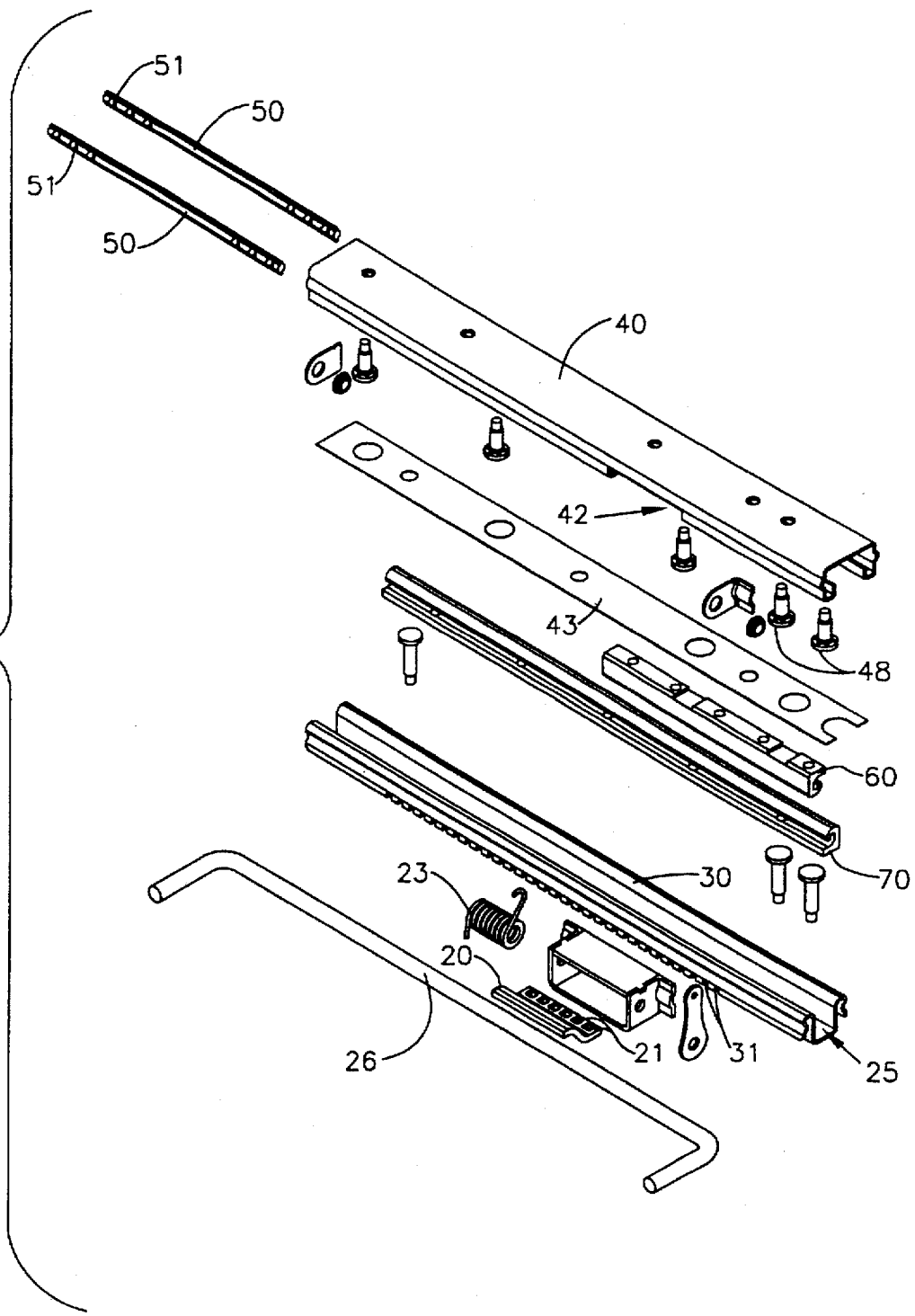
FIG. 2 is an exploded perspective view of the seat track assembly with the upper and lower risers removed for clarity of illustration.
Figure 3:
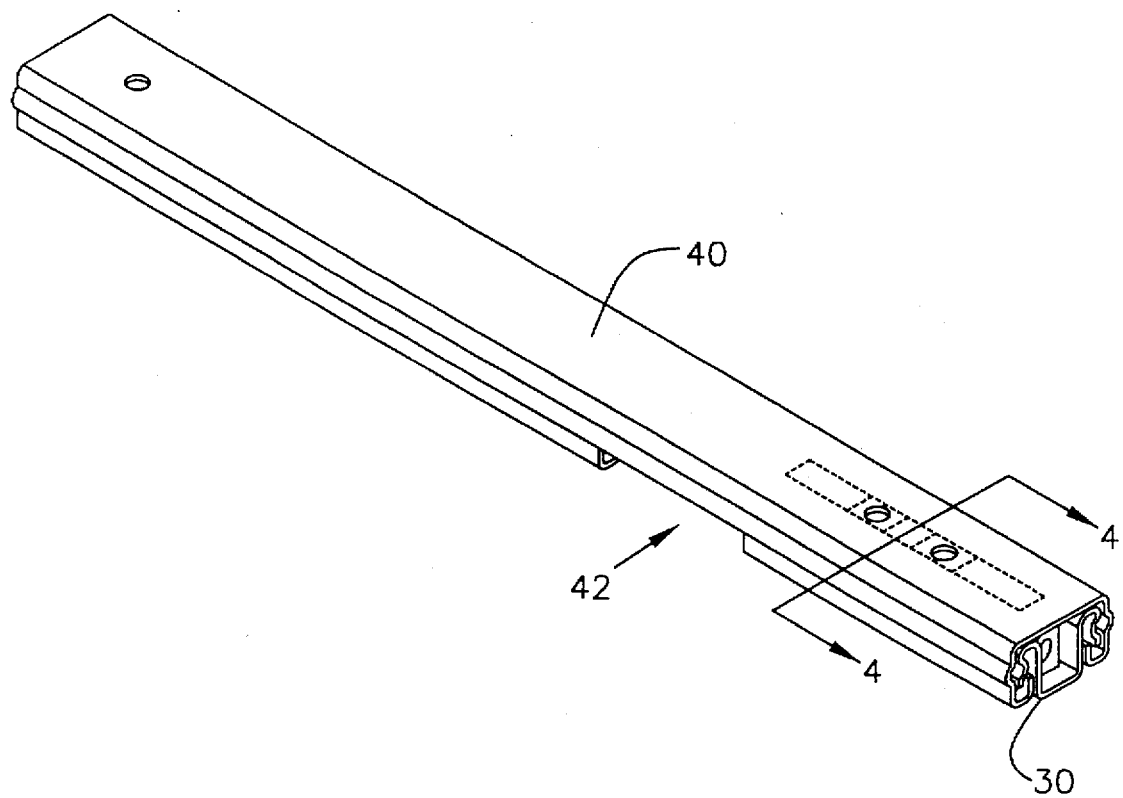
FIG. 3 is an isolated perspective view of one upper track and one lower track.

Referring now to the drawings, FIG. 1 shows a perspective view of a seat 10 for a motor vehicle comprising a seat back 11 attached to a seat base 12. To raise and align the seat upper and lower risers 13, 14, respectively, are used. A suitable attachment mechanism for securing the seat to a motor vehicle may be used, such as attachment hooks 15 biased by a spring 16 toward a latching position to hold the seat firmly to the motor vehicle. The hooks would attach to a floor pan of a motor vehicle, not shown. A lower track assembly 65 has first and second lower tracks preferably spaced apart and aligned generally parallel with one another. The lower track assembly is preferably rigidly attached to the floor pan of the motor vehicle, either directly or by the lower risers and attachment hooks mentioned above. An upper seat track assembly 55 comprises first and second upper tracks, is slidable over corresponding first and second lower tracks. Typically the upper tracks are slidable in a fore-and-aft direction between a full forward position and a full rearward position. Seat belts 88 may be attached directly to the seat as shown in FIG. 1. A latch 20 releasably secures each upper track to the corresponding lower track. In the preferred embodiment shown in FIGS. 1 and 2, rotation of release lever 26 overcomes the force of a latch spring 23 urging the latch 20 into the latching position, thereby causing latch windows 21 to disengage latch teeth 31 on the lower tracks and allow the upper tracks to be slidably adjusted to an alternative fore-and-aft position. The latch windows 21 access the latch teeth 31 through latch opening 42, shown in FIGS. 2 and 3. After moving the upper tracks to a desired location the lever is released and the spring 23 urges the latch 20 to return to a latching position. This process is commonly referred to as "comfort adjustment".

FIGS. 2–5 focus on one pair of seat tracks; lower track 30 and upper track 40. The left upper and lower seat tracks are preferably substantially mirror images of the right upper and lower seat tracks, and therefore, appropriately illustrative of the seat track assembly as a whole. The lower track 30 has a bottom wall 32 and left and right side walls 33, 34 extending from the bottom wall. The left and right side walls cooperate with the bottom wall 32 to define a central channel 25. Left and right flanges 38, 39 extend longitudinally along the upper portion of the left and right side walls 33, 34 respectively, and bend outwardly away from the central channel 25.

In certain preferred embodiments the upper track has left and right J-shaped flanges 44, 45, extending from a top wall 41, each of which receives a corresponding downward portion 38, 39 of the lower track forming an interlocking feature of the seat track assembly. In the normal condition the J-shaped flanges are free to slide past the corresponding downward portions 38, 39, preferably without contacting them. Preferably the J-hooks 60, 70 engage one another in response to a vertical separation force before the J-shaped flanges 44, 45 engage the downward portions 38, 39 of the lower track flanges.

In certain preferred embodiments contact surfaces 35 of the lower track 30 act as the principal load bearing surface between the upper track 40 and the lower track 30, cooperating with the other lower track to receive the weight of the upper track assembly and any objects or passengers placed on the seat base 12. The contact surfaces 35 are formed by upwardly facing portions of the side walls of the lower track, preferably aligned substantially parallel with the top wall 41. Preferably a low friction interface, such as a glide strip 43, is positioned between the top wall 41 of the upper track and the contact surfaces 35 to facilitate smooth movement during comfort adjustment. Glide strip 43 can be formed of any low friction material, such as, for example, a lubristic plastic such as nylon. For side loading and to provide a firm feel to the assembly, lateral stabilization ball bearings 51 positioned by a retainer 50 may be positioned in raceways on either side of the central channel. One-half of each raceway is defined by a curved portion 46 of each flange 38, 39 of the lower track. The other half is formed by a curved portion 47 of each J-shaped flange 44, 45 of the upper track. Other load bearing designs, such as placing the principal load bearing on enlarged ball bearings on either side of the central channel, will be readily apparent to those skilled in the art given the benefit of this disclosure.

Figure 5:
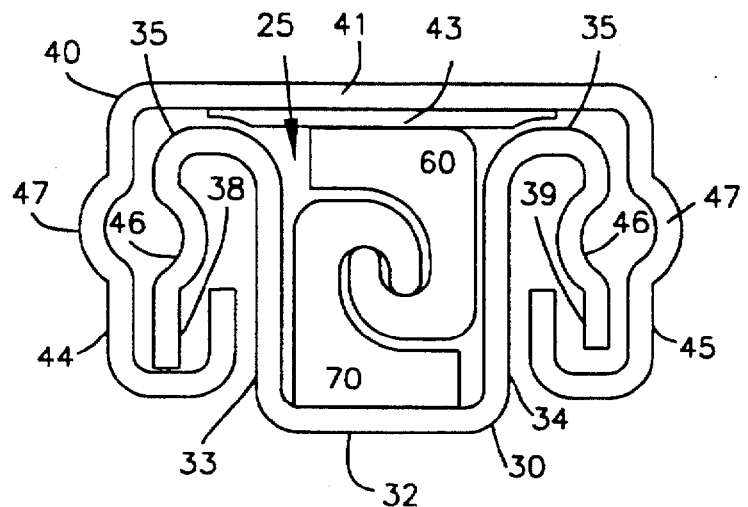
FIG. 5 is a cross section view taken along line 4—4 in FIG. 3 where in response to a vertical dislocation force the upper J-hook moves into contact with the lower J-hook.

Preferably the operation of the upper track sliding over the lower track is smooth to minimize noise and aesthetically unappealing vibrations. This requires proper alignment of the upper track over the lower track, even after being subjected to high vertical dislocation forces. In accordance with a highly advantageous feature internal J-hooks are provided including Lower J-hook 70 mounted to the lower track 30, preferably at the bottom wall 32. Upper J-hook 60 is rigidly attached to the top wall 41 of the upper track 40. The upper J-hook 60 is an elongate member that is mounted in the central channel 25. The upper J-hook 60 is received by the lower J-hook 70 so that in a normal operating condition the J-hooks do not contact one another, and they are free to slide past one another during comfort adjustment. As shown in FIG. 5, in response to a vertical dislocation force the upper J-hook will move into contact with the lower J-hook, resisting dislocation of the upper track from the lower track. Dislocation here means disengagement or undue deformation such as permanent deformation of the seat track sufficient to substantially interfere with normal operation of the seat track assembly. The internal interlocking J-hooks preferably provide sufficient vertical dislocation resistance to meet federal regulations for seat retention.

Preferably both J-hooks are easily formable extrusions, made from, for example, Aluminum 6061-T6. In the embodiment shown in the drawings, the lower J-hook runs nearly the length of the lower track, but the upper J-hook need only extend sufficiently to be in engagement, preferably full engagement over the entire range of fore-and-aft positions of the upper track. Each J-hook may be attached to its corresponding seat track by countersunk screws 48. Alternatively the J-hooks may be welded to the seat tracks. Other suitable attachment means will be readily apparent to those skilled in the art given the benefit of this disclosure.

It should be understood that the J-hooks disclosed herein are exemplary of other interlocking configurations, and that the J-hook is not limited to a precise "J" shape where a hook bends back on itself. Other interlocking configurations will be readily apparent to those skilled in the art given the benefit of this disclosure.

Positioning the upper and lower J-hooks 60, 70 in the central channel 25 advantageously reduces the number of components that need to be mounted externally of the seat tracks, thereby freeing valuable space for uses by occupants of the motor vehicle.

From the foregoing disclosure and detailed description of certain preferred embodiments, it will be apparent that various modifications, additions and other alternative embodiments are possible without departing from the true scope and spirit of the invention. For example, the internal J-hooks disclosed herein may also be used with additional mechanisms for resisting vertical dislocation, as well as other position fixing devices. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly comprising, in combination:
   a lower track assembly for mounting to a floor comprising first and second lower tracks laterally spaced from and aligned generally parallel with one another, each lower track having left and right side walls cooperating to define an elongate central channel, the left and right side walls having left and right longitudinal flanges, respectively, bent away from the central channel;
   an upper track assembly operably engaging the lower track assembly and comprising a first upper track and a second upper track carried over the first and second lower track, respectively;
   a first elongate upper J-hook and a second elongate upper J-hook rigidly attached to the first and second upper track, respectively, and positioned in the corresponding central channel; and
   a first elongate lower J-hook and a second elongate lower J-hook rigidly attached to the first and second lower track, respectively, positioned in the corresponding central channel;
   wherein the upper J-hooks slide free of the lower J-hooks in a normal operating condition, and each upper J-hook is received by the corresponding lower J-hook to resist vertical dislocation of the upper track.

2. The seat track assembly of claim 1 wherein each upper track has a top wall and each upper J-hook is attached to the corresponding top wall.

3. The seat track assembly of claim 2 wherein each left flange forms one half of a left ball race, each right flange forms one half of a right ball race, and each upper track forms a second half of the corresponding left and right ball race.

4. The seat track assembly of claim 2 wherein each upper track further comprises longitudinally extending left and right J-shaped flanges which receive a corresponding downward portion of the left and right flanges, respectively, of the corresponding lower track to resist vertical dislocation of each upper track from the corresponding lower track.

5. The seat track assembly of claim 4 wherein each upper J-hook engages the corresponding lower J-hook in response to a vertical separation force before the J-shaped flanges engage the downward portions of the lower track left and right flanges.

6. The seat track assembly of claim 1 wherein each upper J-hook and each lower J-hook comprises an elongate metal extrusion.

7. The seat track assembly of claim 6 wherein the extrusions comprises aluminum alloy AL 6061-T6.

8. The seat track assembly of claim 1 wherein each lower track has latch teeth and each upper track has a latch having latch windows that engage the latch teeth of the corresponding lower track to hold the upper track to the corresponding lower track in a latching position.

9. The seat track assembly of claim 1 wherein each lower track has a bottom wall and each lower J-hook is attached to the corresponding bottom wall.

10. The seat track assembly of claim 9 wherein each upper track has a longitudinally extending top wall and the left and right side walls each have a longitudinally extending, principal load bearing contact surfaces aligned substantially parallel with the corresponding top wall.

11. A seat track assembly comprising, in combination:
    a lower track assembly comprising first and second lower tracks laterally spaced from and aligned generally parallel with one another, each lower track having left and right side walls cooperating to define an elongate central channel, and the left and right side walls each having principal load bearing contact surface;
    an upper track assembly operably engaging the lower track assembly and comprising a first upper track and a second upper track carried over the first and second lower track, respectively, each upper track having a longitudinally extending top wall, and the contact surfaces of the lower tracks being substantially parallel with the corresponding top wall;
    a first elongate upper J-hook and a second elongate upper J-hook rigidly attached to the first and second upper track, respectively, and positioned in the corresponding central channel; and
    a first elongate lower J-hook and a second elongate lower J-hook rigidly attached to the first and second lower track, respectively, positioned in the corresponding central channel;
    wherein the upper J-hooks slide free of the lower J-hooks in a normal operating condition, and each upper J-hook is received by the corresponding lower J-hook to resist vertical dislocation of the upper tracks.

12. The seat track assembly of claim 11 wherein the upper track assembly further comprises a first elongate glide strip and a second elongate glide strip attached to the first upper track and the second upper track, respectively, and directly contacting the corresponding contact surfaces of the lower track.

13. The seat track assembly of claim 11 wherein the left and right side walls each have left and right longitudinal flanges, respectively, bent away from the central channel.

14. A seat track assembly comprising, in combination:

a lower track assembly comprising a lower track having left and right side walls extending from a bottom wall cooperating with the bottom wall to define an elongate central channel;

an upper track assembly operably engaging the lower track assembly and comprising an upper track carried over the lower track;

an elongate upper J-hook rigidly attached to the upper track, positioned in the central channel; and an elongate lower J-hook rigidly attached to the lower track at the bottom wall, positioned in the central channel;

wherein the upper J-hook slides free of the lower J-hook in a normal operating condition, and the upper J-hook is received by the corresponding lower J-hook to resist vertical dislocation of the upper track.

15. The seat track assembly of claim 14 wherein a lower riser assembly comprising front and rear risers attached to the bottom wall of the lower track;

an attachment hook attached to each front and rear riser for attachment to a motor vehicle, and biasing means for biasing each attachment hook towards an attachment position;

an upper riser assembly comprising an upper riser attached to the top wall of the upper track;

a seat base attached to the upper riser assembly; and a seat back pivotably attached to the seat base.

16. A seat track assembly comprising, in combination:

a lower track assembly comprising first and second lower tracks laterally spaced from and aligned generally parallel with one another, each lower track having a bottom wall and left and right side walls extending from the bottom wall, cooperating with the bottom wall to define a central channel;

an upper track assembly operably engaging the lower track assembly and comprising a first upper track and a second upper track carried over the first and second lower track, respectively;

a first elongate upper J-hook and a second elongate upper J-hook rigidly attached to the first and second upper track, respectively, and positioned in the corresponding central channel; and a first elongate lower J-hook and a second elongate lower J-hook rigidly attached to the bottom wall of the corresponding first and second lower track, respectively, positioned in the corresponding central channel;

wherein the upper J-hooks slide free of the lower J-hooks in a normal operating condition, and each upper J-hook is received by the corresponding lower J-hook to resist vertical dislocation of the upper tracks.

17. The seat track assembly of claim 16 wherein each upper track further comprises a top wall, and the left and right side walls of each lower track extend from the corresponding bottom wall toward the corresponding top wall.

\* \* \* \* \*